(12) United States Patent
Yanagi

(10) Patent No.: US 6,198,522 B1
(45) Date of Patent: Mar. 6, 2001

(54) LCD HAVING CONTACT AREAS BETWEEN ELECTRODE PADS AND CORRESPONDING WIRING PATTERNS EQUAL TO ONE ANOTHER

(75) Inventor: Masahiro Yanagi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/366,334

(22) Filed: Aug. 2, 1999

(30) Foreign Application Priority Data

Aug. 3, 1998 (JP) .................................................. 10-219392

(51) Int. Cl.$^7$ .................................................. G02F 1/1345
(52) U.S. Cl. ........................... 349/152; 349/149; 349/139
(58) Field of Search ..................................... 349/152, 149, 349/150, 151, 139

(56) References Cited

U.S. PATENT DOCUMENTS

| | | | | |
|---|---|---|---|---|
| 5,499,131 | * | 3/1996 | Kim | 349/149 |
| 5,677,712 | * | 10/1997 | Murahashi | 349/149 |
| 5,748,179 | * | 5/1998 | Ito et al. | 349/152 |

* cited by examiner

*Primary Examiner*—William L. Sikes
*Assistant Examiner*—Toan Ton
(74) *Attorney, Agent, or Firm*—Morgan, Lewis & Bockius LLP

(57) ABSTRACT

An IC chip 2 having a plurality of electrode pads having different areas is directly mounted on a plurality of wiring patterns on a film substrate 4 which are connected to a liquid crystal panel 1 so that a plurality of electrode pads 3 on the IC chip 2 are electrically connected to the plurality of wiring patterns 5, respectively. The width of each wiring pattern 5 is defined in accordance with the size of each wiring pad (i.e. length of the wiring pattern 5 crossing the electrode pad 3) so that the contact area Sn (=Wn×Ln) between each electrode pad 3 and the corresponding wiring pattern 5 is kept constant. In this configuration, a liquid crystal (LC) display device with great reliability can be obtained in which each electrode pad of the IC chip is stably electrically-connected to the corresponding unstable wiring pattern as in a COF type display device.

6 Claims, 4 Drawing Sheets

LCD HAVING CONTACT AREAS BETWEEN ELECTRODE PADS AND CORRESPONDING WIRING PATTERNS EQUAL TO ONE ANOTHER

BACKGROUND OF THE INVENTION

1. Field of the Invention

The present invention relates to a liquid crystal display device of a "chip-on-glass" (hereinafter referred to as "COG") type or "chip-on-film" (hereinafter referred to as "COF") type in which a semiconductor chip is directly mounted on a wiring pattern on a substrate of e.g. glass constituting a liquid crystal panel, or on a film substrate connected directly or through a heat seal to a liquid crystal panel. The present invention is more particularly to a liquid crystal display device capable of making the connecting pressure between each of electrodes pads of the semiconductor chip and a wiring pattern constant so that uniform electric connection therebetween can be obtained.

2. Description of the Related Art

In a liquid crystal display (LC) device, transparent electrode patterns are formed respectively on two glass substrates so that they are opposite to and spaced from each other by a prescribed interval, and a liquid crystal material is sandwiched therebetween. A data signal is supplied to each of segment electrodes (pixel electrodes) so that each segment electrode is on/off controlled to provide a desired display. Traditionally, supply of the data signal to each segment electrode was made in such a manner that each segment electrode is connected to a circuit board and the data signal is directly supplied from a signal processing circuit provided on the circuit board to each segment electrode.

However, an increase in the number of segment electrodes leads to a great increase in the number of connecting wirings. Therefore, in recent years, a COG type display device is used in which a semiconductor chip (IC chip) for signal processing is directly mounted on a glass substrate, or a COF type display device is used in which the IC chip is directly mounted on a wiring pattern of a film substrate electrically connected to a liquid crystal panel.

Meanwhile, FIG. 6A is a plan view of a connection portion between a part of an IC chip 2 and wiring patterns 5. As seen from FIG. 4, the interval A between the wiring patterns 5 is as narrow as 50–100 $\mu$m. For this reason, the electric connection between the IC chip and wiring pattern of the COG type and COF type display devices is made by thermal crimping technique. In this technique, as seen from the section shown in FIG. 6B, anisotropic conductive adhesive 6 is applied or labelled on the wiring pattern 5 on the film substrate 4, the IC chip 2 is pressed thereon with constant force F while heating (by thermal compression bonding method), and the adhesive is hardened. The anisotropic conductive adhesive 6 is composed of epoxy resin mixed with metallic conductive particles 6a. When the adhesive 6 is pressed by fixed force, the epoxy resin is extruded in a lateral direction. Since the conductive particles 6a are sandwiched between an electrode pad 3 of the IC chip 2 and the wiring pattern 5, the electrode pad 3 and the wiring pattern 5 are electrically connected to each other. On the other hand, in the lateral direction, they are insulated by the epoxy resin.

With a development of the miniaturization and high definition of the liquid crystal display device in recent years, the numbers of output terminals increases and electrode pads of the IC chip 2 to be connected to the wiring patterns 5 have been increased. Where different numbers of the electrode pads 3 are provided on e.g. both opposite sides of the IC chip 2, the electrode pads 3 each having a prescribed width cannot be provided at regular intervals so that there is a tendency for the electrode pads 3 to have different areas. For example, in FIG. 6B, electrode pad C has a large width of 85 $\mu$m whereas electrode pad B has a small width of 47 $\mu$m. In this case, each wiring of the wiring pattern has a width enough to cover any electrode pad 3. Therefore, the contact area between each electrode pad 3 and each wiring of the wiring pattern 5 is 85 $\mu$m (width)×85 $\mu$m (length) for the electrode pad C and 47 $\mu$m×85 $\mu$m for the electrode pad B. The ratio of contact area between the electrode pads C and B is as large as about 9:5, and difference of the contact area between the electrode pads C and B is large.

As described above, where a plurality of electrode pads of the IC chip are provided, there is a tendency for the electrode pads to have different areas. On the other hand, traditionally, each wiring of the wiring pattern 5 is formed to cover the corresponding electrode pad. Therefore, as the case may be, the areas of the electrode pads of the IC chip and the wiring pattern are different according to different electrode pads. The electrode pads and the corresponding wiring patterns are connected by thermal crimping through application of prescribed pressure using anisotropic conductive adhesive of epoxy resin mixed with conductive particles. Therefore, different contact areas lead to different pressures to be applied to the conductive particles to be in contact with each electrode pad. With different pressures, the conductive particles are not sufficiently crushed at the electrode pad to which low pressure is applied, thereby providing insufficient electrical contact and hence poor contact. Such a tendency is particularly remarkable where the IC chip is mounted on a soft flexible film substrate as in the case of COF type display device.

The present invention has been accomplished in order to solve such a problem.

SUMMARY OF THE INVENTION

An object of the present invention is to provide a reliable liquid crystal display device in which each electrode pad of an IC chip and wiring pattern can be always stably electrically-connected on an unstable wiring pattern like an COF type display device.

In order to attain the above object of the present invention, in accordance with the present invention, there is provided a liquid crystal display device comprising: two substrates constituting a liquid crystal panel, on which electrode patterns are formed and between which a liquid crystal layer is sandwiched; a plurality of wiring patterns located on each substrate or a film substrate electrically connected to the liquid crystal panel; a semiconductor chip having a plurality of electrode pads having different areas and directly mounted on the plurality of wiring patterns so that the electrode pads are electrically connected to the plurality of wiring patterns, wherein the wiring patterns are defined in accordance with the areas of the plurality of electrode pads so that contact areas between the electrode pads and the corresponding wiring patterns are made equal to one another.

The electrode pads refer to areas which permits electrodes of the semiconductor chip to be connected to external wirings, and may have bumps formed thereon. The film substrate is a substrate in which wiring patterns of a metallic film are formed on an insulating film such as a flexible film.

In this configuration described above, the contact areas between the electrode pads and the corresponding wiring patterns are always equal even when the areas of the electrode pads are different. Therefore, when the semiconductor chip is mounted on the wiring patterns using anisotropic conductive adhesive, constant force is always applied to each electrode pad. Thus, even when the semiconductor chip is mounted on an unstable film like a COF type display device, stable connection can be made, thereby providing a reliable liquid crystal display device.

Preferably, each wiring pattern is sized so that each electrode pad has a width larger than that of the corresponding wiring pattern by 10 µm or larger. In this configuration, even if the semiconductor chip is slightly displaced, a part of the wiring pattern does not extend off the electrode pad, thus keeping the contact area constant.

Preferably, an area of the semiconductor chip other than the area thereof where the electrode pad is to be formed is covered with an insulating film. This prevents the semiconductor chip from being short-circuited with the wiring pattern.

Preferably, the surface of the insulating film is located at a higher position than that of the electrode pad. Where the insulating film is formed, even if the electrode pad has no bump, since the contact areas between the electrode pads and the corresponding wiring patterns are always equal, constant force is always applied to each electrode pad, thereby obtaining a sure and reliable connection. In this case, the step of forming the bump is not required so that the number of man-hours can be simplified.

Further,. preferably, the wiring pattern is perpendicular to the one side of the electrode pad at least in the neighborhood of a connecting portion with the electrode pad. This surely makes equal the contact areas between the electrode pads and the corresponding wiring patterns.

The above and other objects and features of the present invention will be more apparent from the following description taken in conjunction with the accompanying drawings.

DESCRIPTION OF THE PREFERRED EMBODIMENTS

Figure 1:
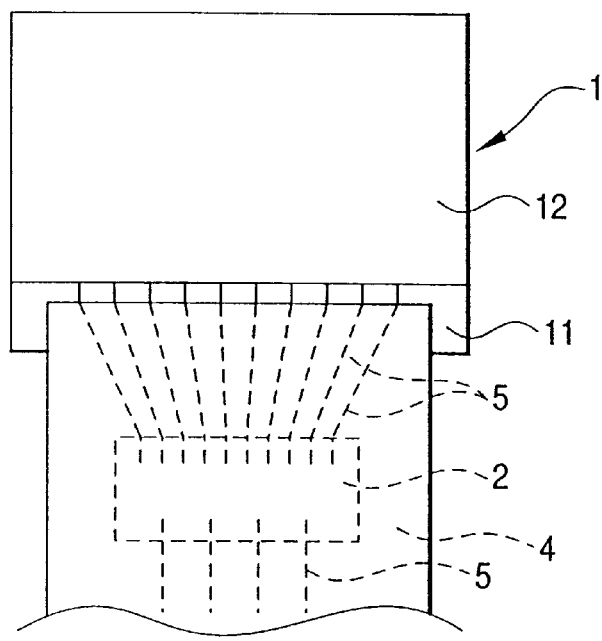
FIGS. 1A–1C are views for explaining an electrode pad portion and a bonding portion of an IC chip in a first embodiment of the liquid crystal display device according to the present invention.
Figure 1:
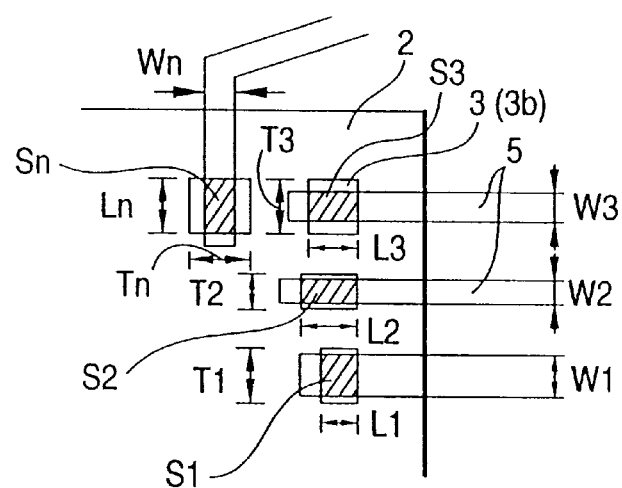
Figure 1:
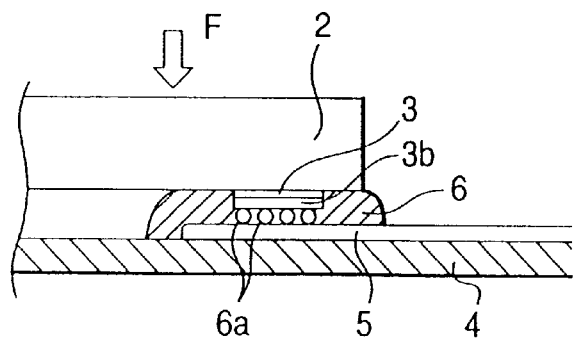

Now referring to the drawings, an explanation will be given of embodiments of a liquid crystal display device.

Embodiment 1

FIG. 1A is a plan view of a first embodiment of an liquid crystal display device according to the present invention. As seen from FIG. 1A, a liquid crystal (LC) panel 1 is structured so that a liquid crystal material is sandwiched between two substrates 11 and 12 on which electrode patterns (not shown) are formed. A semiconductor chip (hereinafter referred to as "IC chip") having a plurality of electrode pads with different areas are directly mounted on a plurality of wiring patterns of each substrate of the LC panel. Otherwise, such an IC chip is directly mounted on a plurality of wiring patterns 5 on a film substrate 4 in which the wiring patterns are formed on a flexible film 5 connected to the LC panel. In this way, a plurality of electrode pads 3 of the semiconductor chip 2 and a plurality of wiring patterns 5 are connected to each other.

FIG. 1B schematically shows a relationship between a part of the IC chip 2 and the wiring patterns 5. As seen from FIG. 1B, the present invention is characterized in that the width Wn of each wiring pattern 5 is defined according to the size of the bump 3b (length of the wiring pattern 5 crossing the bump 3b) so that the contact areas Sn (=Wn×Ln) between bumps 3b formed on the electrode pads 3 of the IC chip 2 and the corresponding wiring patterns 5 have equal areas.

Figure 2:
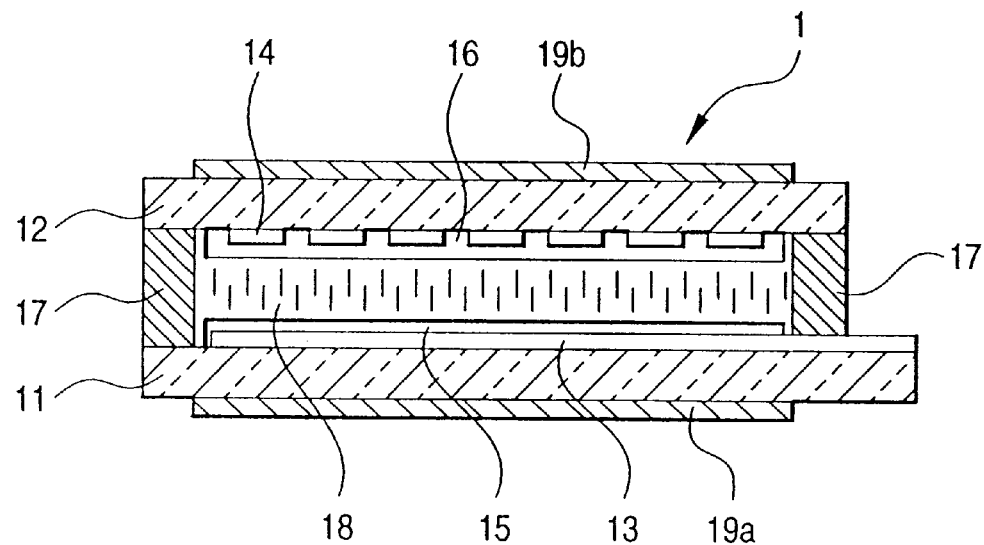
FIG. 2 is a view for explaining the section of an example of a liquid crystal panel shown in FIG. 1.

The LC panel 1 has the same structure as that of an ordinary LC panel, as seen from the sectional view of FIG. 2. Specifically, on the internal surfaces of the insulating substrates 11 and 12, electrode patterns 13 and 14 are formed respectively, and orienting films 15 and 16 for orienting liquid crystal molecules in a prescribed direction are also formed. These two insulating substrates 1 and 2 are bonded to each other on their edges by a sealant 17 so that they hold a prescribed gap by a spacer (not shown) and the electrode patterns 13 and 14 are opposite to each other. A liquid crystal material is injected into the gap to form a liquid crystal layer 18 which is sandwiched by the insulating substrates 11 and 12. On the outsides of the insulating substrates 11 and 12, polarizing plates 19a and 19b are formed. The liquid crystal panel 1 has the configuration as described above. When a voltage is applied between the opposite electrode patterns 13 and 14, the orientation of the liquid crystal molecules is changed so that the direction of the polarizing plates 19a and 19b and transmission/non-transmission of light from a back light (not shown) are controlled. Thus, the respective pixels are turned on/off to provide a desired display.

The IC chip 2 is provided with a signal processing circuit which can process an input data signal so that an on/off control signal is applied to each segment electrode (pixel electrode), thereby providing a desired display. Electrode terminals of the signal processing circuit are extended as electrode pads 3 on the one surface of the IC chip 2. On the surface of each electrode pad 3, the bump 3b which is a protrusion having a desired height is formed, and the bump 3b is connected to the wiring pattern on the insulating substrate. As described above and illustrated in FIG. 1B, these electrode pads may not have equal widths Tn and lengths Ln according to the number of electrode pads 3 extended to the one end and layout of the electrode pads 3. Thus, the present invention is directed to the IC chip 2 with the electrode pads having different areas. The electrode pads 3 can be provided in such a manner that metal for electrodes are deposited on the one surface of the IC chip 2. However, in this embodiment, the bump 3b of metal is further formed on the surface of the electrode pad 3.

The film substrate 4 is formed so that the terminals of the electrode patterns of the liquid crystal panel 1 are connected to the side of a circuit board through e.g. a heat seal (not shown) or directly and the wiring patterns 5 of conductive thin film of e.g. Cu are formed on an insulating film having flexibility.

The wiring patterns 5 are patterned by etching the Cu film deposited through bonding or evaporation on the film substrate 4. In the present invention, the respective wirings of the wiring patterns 5 are not formed with equal widths, but formed so that their contact areas (shaded portion in FIG. 1B) with the electrode pads 3 are equal according to the sizes of the electrode pads 3 of the IC chip 2 (S1=S2= ... =Sn). Specifically, since the IC chip to be mounted is previously known and the size and pitch of each electrode pad 3 and bump 3b formed thereon is also known, according to each electrode pad 3 and bump 3b superposed thereon, each wiring pattern is patterned to have a width Wn of the wiring connected to the bump 3b so that Wn×Ln=constant. For example, three kinds of electrode pads (bumps) inclusive of 80 μm×80 μm, 70 μm×80 μm and 50 μm×80 μm are provided on the IC chip. Where the electrode pads 3 indicated by S1 to S3 are formed with L1=50 μm (T1=80 μm), L2=80 μm (T2=50 μm) and L3=70 μm (T3=80 μm), W1=64 μm, W2=40 μm and W3=45.7 μm.

In order that the wiring patterns 5 have equal contact areas with the corresponding electrode pads 3 (bumps 3b) of the IC chip 2, as described above, the wiring patterns must be patterned with their widths suitably defined. In addition, patterning satisfying the following condition contributes to making the contacts areas equal even when variations in manufacturing occur.

Figure 3:
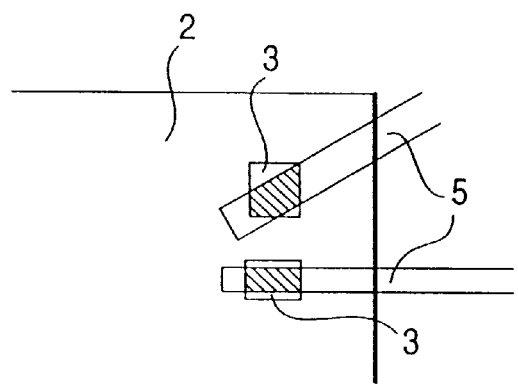
FIG. 3 is a view showing an undesired relationship between an electrode pad and a wiring pattern.

First, the wiring pattern 5 is preferably formed perpendicularly to the pattern of the electrode pad 3 at an area where it crosses the electrode pattern 3. For example, as shown in FIG. 3, if the wiring pattern 5 is formed to be oblique to the electrode pad 3, a relative position between the IC chip 2 and wiring pattern 5 is likely to change, so that the contact area therebetween is liable to change.

Further, the width W of the wiring pattern 5 is preferably smaller than that of the electrode pad 3 by about 10 μm. Specifically, the difference in width (clearance) of at least 10 μm should be assured between the electrode pad 3 and each wiring pattern 5. Namely, in the above example, W1+10≦Ti, W2+10≦T2 and W3+10≦T3. In the bonding of the IC chip 2, slight deviation in position (e.g. ±5–8 μm) may occur. However, in such a case, setting the above clearance prevents a non-superposed area between the electrode pad 3 and the wiring pattern 5 from being generated. Thus, in accordance with a design rule, the contact areas can be made equal.

The IC chip 2 can be bonded onto the wiring patterns 5 on the film substrate 4 as seen from a partial sectional view of FIG. 1C, in such a way that an anisotropic conductive adhesive 6 containing conductive particles 6a in epoxy resin is applied on the periphery of each of the wiring patterns 5 on the film substrate 4 and IC chip 2 is mounted and pressed on the wiring patterns 5 under certain force F and heated in this state. In this case, between the electrode pad 3 and the wiring pattern 5, the epoxy resin is extruded out laterally and the conductive particles are sandwiched therebetween and partially crushed. Thus, the electrode pad 3 and wiring pattern 5 can be sufficiently electrically connected to each other. In the present invention, the contact areas are equal between the electrode pads 3 and the wiring patterns 5 so that the number of the conductive particles 6a sandwiched therebetween is substantially equal. Thus, constant pressure is applied to any conductive particle 6a so that the crushed degree thereof is constant.

In accordance with the present invention, the width of each of the wiring patterns is defined so that the contact areas between the electrode pads and wiring patterns are equal. Therefore, the pressure applied to each electrode pad when the IC chip is bonded as described above is constant. Correspondingly, the pressure applied to the particles sandwiched between the electrode pad and the wiring pattern is also constant. As a result, any particle is crushed by the constant pressure so that the electrode pad with poor contact is not made. This improves the production yield of the device and greatly improves the reliability.

The wiring of the wiring pattern 5 is preferably formed perpendicularly to the pattern of the electrode pad 3 at an area in the neighborhood of the electrode pad so that the contact area therebetween are always kept constant. Therefore, if the IC chip is slightly displaced, the contact area is kept constant. Further, the wiring pattern 5 is formed to have a small size enough to be provided with difference of at least about 10 μm between the wiring pattern and electrode pad. Therefore, if the IC chip is slightly displaced, a part of the wiring pattern does not extend off the electrode pad, thus keeping the contact area constant.

In the embodiment described above in which the IC chip was formed on the film substrate, because of large elasticity of the film, more poor contact occurs at an area with lower pressure applied. The present invention can be applied to such a case. However, the present invention can improve the reliability even when the IC chip is bonded to a glass substrate as in the COG type display device. In the above embodiment, the bump 3b was formed on the same region as the electrode pad 3. However, if their area and shape are not the same, the wiring pattern must be defined according to the size of the bump.

Embodiment 2

Figure 4:
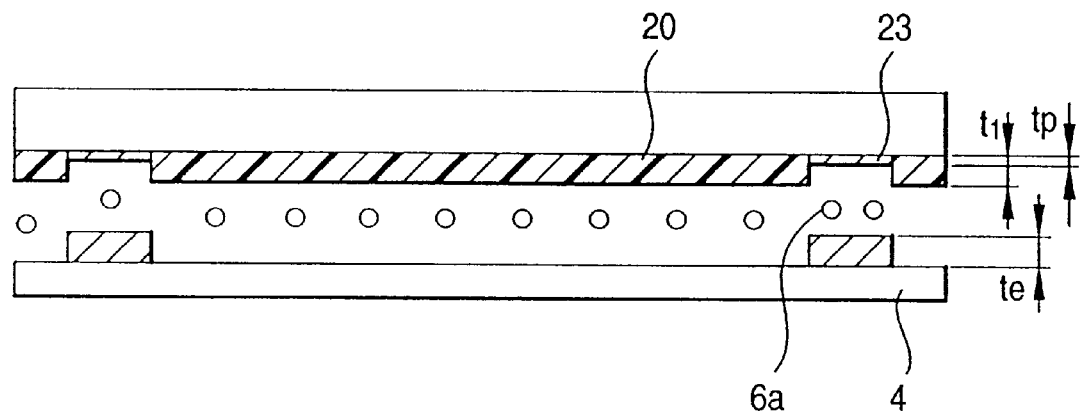
FIG. 4 is a sectional view of a second embodiment of the liquid crystal display device according to the present invention.

An explanation will be given of a second embodiment of the liquid crystal display device according to the present invention. In this embodiment, as seen from FIG. 4, the bump is not formed, but the region other than the area where the electrode pad 23 is to be formed is covered with a polyimide film 20 having a thickness of ti=5 μm or so. The electrode pad 23 having a thickness tp=200–300 nm is connected to the wiring pattern having a thickness of te, which is formed on the film substrate 4, through an anisotropic conductive film 26. In this embodiment, the anisotropic conductive film 26 contains conductive particles 6a each having a diameter of about 5 μm. Five or so conductive particles are located on each electrode pad 23. The wiring pattern is designed so that its contact area with the electrode pad 23 is uniform. In this way, connection between the electrode pad and the wiring pattern can be formed with great reliability without making the bump on the electrode pad.

Incidentally, in this embodiment, although the wiring pattern was formed on the film substrate 4, it may be formed on any other substrate. However, the present invention can be most effectively applied to the film substrate which generally makes it difficult to form a good contact owing to pressure difference therein.

Figure 5:
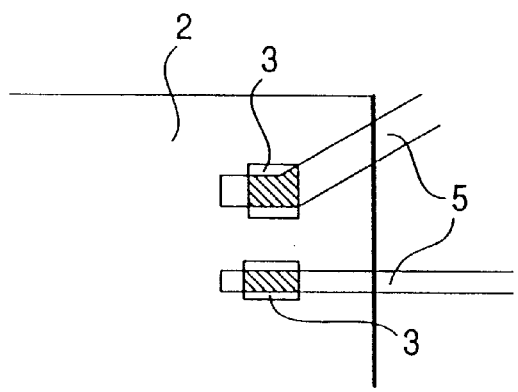
FIG. 5 is a view showing an undesired relationship between an electrode pad and a wiring pattern.
Figure 6:
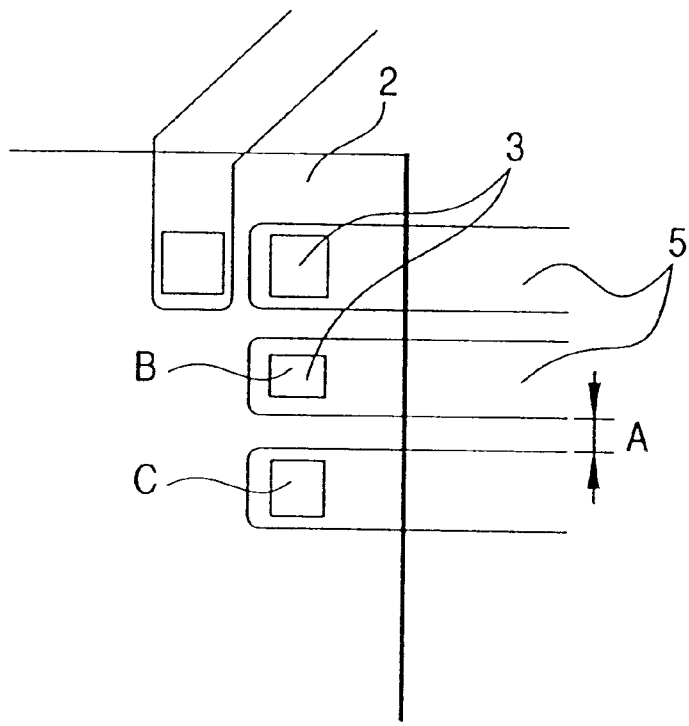
FIGS. 6A–6B are views showing a bonding portion of an IC chip of a conventional liquid crystal display device.
Figure 6:
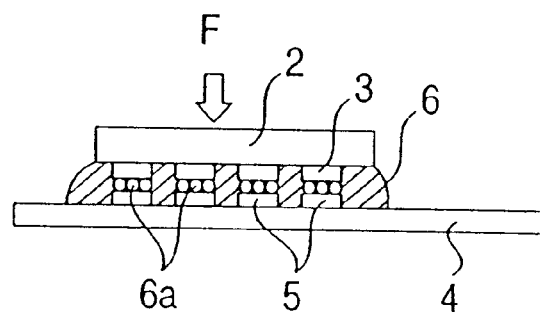

Further, as seen from FIG. 5 the wiring pattern has only to be formed perpendicularly to the electrode pad in only the neighborhood of its connecting region with an IC chip.

What is claimed:
1. A liquid crystal display device comprising:

two substrates constituting a liquid crystal panel, on which electrode patterns are formed and between which a liquid crystal layer is sandwiched;

a plurality of wiring patterns located on each of the substrates or a film substrate electrically connected to the liquid crystal panel; and a semiconductor chip having a plurality of electrode pads having different areas and directly mounted on said plurality of wiring patterns so that the electrode pads are electrically connected to said plurality of wiring patterns, wherein said wiring patterns are defined in accordance with the areas of said plurality of electrode pads so that contact areas between the electrode pads and the corresponding wiring patterns are made equal to one another.

2. A liquid crystal display device according to claim 1, wherein each wiring pattern is sized so that each electrode pad has a width larger than that of the corresponding wiring pattern by 10 μm or larger.

3. A liquid crystal display device according to claim 1, wherein a bump is formed on each of the electrode pads, and the bump is bonded to each of the corresponding wiring patterns.

4. A liquid crystal display device according to claim 1, wherein an area of said semiconductor chip other than the area thereof where said electrode pad is to be formed is covered with an insulating film.

5. A liquid crystal display device according to claim 4, wherein a surface of said is located at a higher position than that of said electrode pad.

6. A liquid crystal display device according to claim 1, wherein said wiring pattern is perpendicular to the one side of said electrode pad at least in the neighborhood of a connecting portion with said electrode pad.

* * * * *